Oct. 11, 1927.
F. H. STAFFORD
FISHING TOOL
Filed Feb. 7, 1927
1,645,461
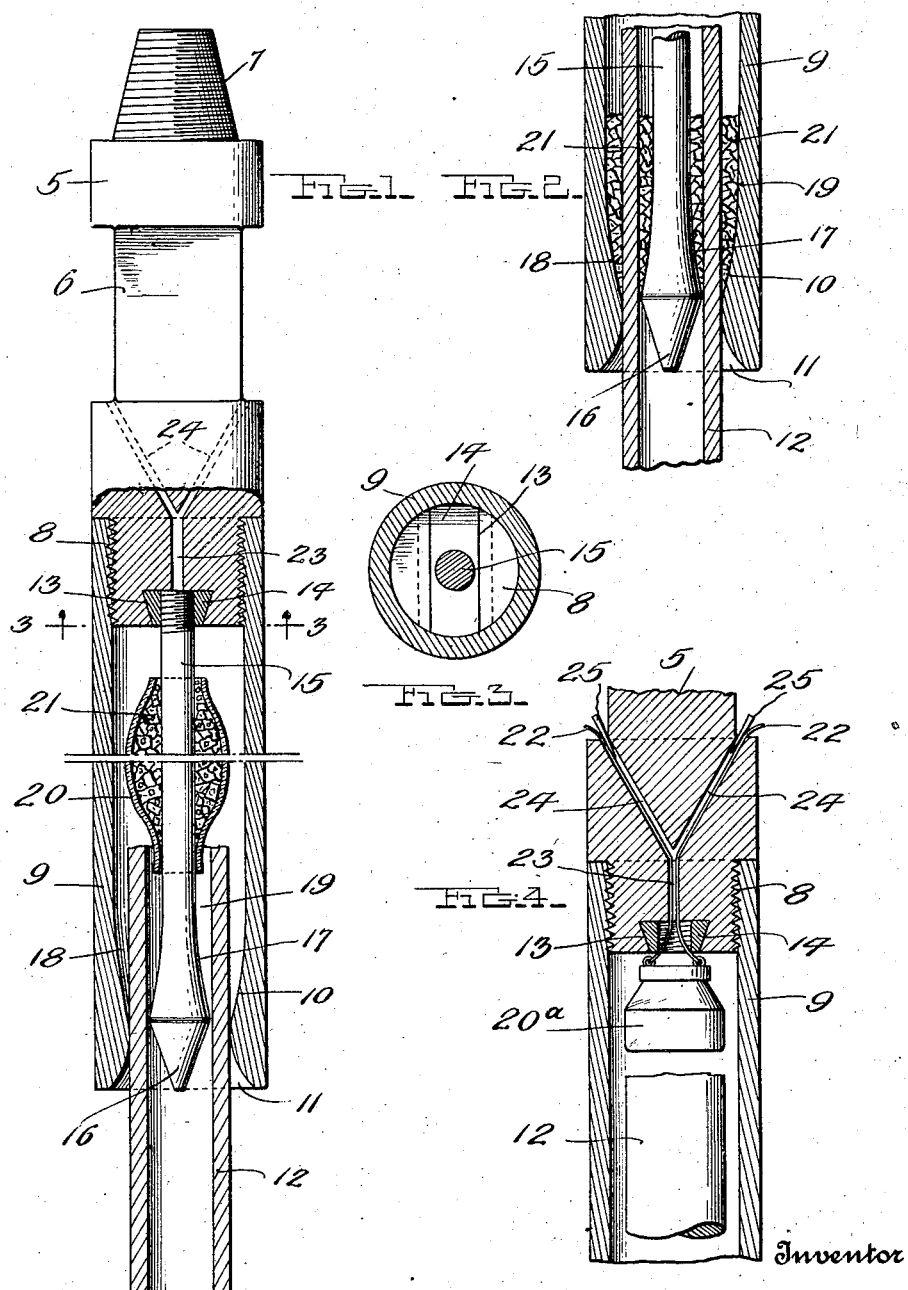
Witness
J. R. Pierce
Inventor
F. H. Stafford
By H. B. Williamson & Co.
Attorneys Patented Oct. 11, 1927.

1,645,461

UNITED STATES PATENT OFFICE.

FLOYD H. STAFFORD, OF EASTLAND, TEXAS.

FISHING TOOL.

Application filed February 7, 1927. Serial No. 166,553.

The invention relates to devices for removing broken or lost tools or tubes from drilled wells, and it aims to provide a new and improved device of this class in which novel provision is made for establishing a tenacious connection between the fishing tool and the tool or the like to be recovered.

A further aim of the invention is to provide a fishing tool which, if the object to be recovered is of tubular form, will grip the latter both internally and externally.

A further aim is to provide a fishing tool in which provision is made to prevent loss of any of the tube and tool connecting means, down the tube, by providing said tool with means which closes the tube at its upper end.

Yet another aim is to provide a fishing tool which, while being rather simple and inexpensive, and easy to operate, will be efficient, durable and in every way desirable.

With the foregoing and minor objects in view, the invention resides in the novel subject matter hereinafter described and claimed, the description being supplemented by the accompanying drawings.

Fig. 1 is a vertical longitudinal section illustrating the fishing tool telescoped with the upper end of a tube to be recovered.

Fig. 2 is a sectional view similar to a portion of Fig. 1 and disclosing the manner in which the connection is established between the tool and tube.

Fig. 3 is a horizontal section on line 3—3 of Fig. 1.

Fig. 4 is a fragmentary vertical section showing the fishing tool conditioned for fishing out a solid tool instead of a tubular object.

In the drawing above briefly described, the numeral 5 designates a vertically elongated metal body which is preferably of cylindrical form with the exception of the wrench-engaging, squared portion 6, the upper end of said body being reduced and threaded as at 7 for engagement with a drilling jar, while the lower end of said body is reduced and threaded as at 8. A vertically disposed barrel 9 has its upper end threaded upon the reduced lower end 8 of the body 5 and in addition to this threaded connection, some other connecting means might also be employed if desired. The barrel 9 is internally tapered toward its lower end as indicated at 10 and below the taper, is flared as at 11, permitting it to readily pass over a tube or other object 12 to be recovered from a well.

In the present disclosure of the invention, a dove-tail groove 13 is formed in the lower extremity of the body 5, and said groove snugly receives a nut 14 which is of elongated form and preferably has its ends threaded in alinement with the threads 8.

Threaded at its upper end into the nut 14, is a preferably cylindrical tongue 15 whose lower end is pointed as at 16 to be readily received in the object 12 if the latter be of tubular nature. The tongue 15 is enlarged somewhat above the taper 16 and is upwardly tapered as at 17, from the enlargement. This enlargement is of a diameter to substantially fill the interior of a tube to be withdrawn from a well, and the internal diameter of the barrel 9, at the lower end of its taper 10, is of substantially the same dimension as the external diameter of the tube to be recovered. Thus, a downwardly tapered space 18 is provided between the major portion of the barrel and the tube 12, and a second downwardly tapered space 19 is provided between said tube and the tongue 15. Provision is made for supplying connecting means to these spaces when the fishing tool is engaged with the tube 12, and said connecting means will wedge into said spaces and bite the barrel 9, the tube 12, and the tongue 15, so that a tenacious connection is established between the tool and the tube, permitting withdrawal of the latter from the well.

In the present disclosure, an annular, fragile container 20 surrounds the tongue 15 and normally engages the taper 17 thereof so that it is prevented from sliding entirely off of said tongue. Within this container, are the connecting means above referred to, said connecting means preferably consisting of a myriad of sharp-edged nuggets of steel, denoted at 21. The container 20 is of an external diameter greater than the internal diameter of the tube 12 to be recovered, and when the fishing tool is completely engaged with said tube, said container is crushed between the upper end of the tube and the lower end of the body 5. Hence, the nuggets 21 are freed and they will drop by gravity into the spaces 18 and 19. Then, by operating the drilling jar to lightly tap the fishing tool upwardly, the nuggets are wedged into the spaces 18 and 19 and caused to effectively bite into the tube 12, the tongue 15, and the barrel 9. Hence, a tenacious connection is established between the fishing tool and the tube 12, permitting withdrawal of the latter from the well, and attention is invited to the fact that the operation of the drilling jar to effectively engage the fishing tool with the tube, produces only upward impulses, so that there is no tendency to more tightly lodge the tube or the like in the well.

In the present disclosure of the invention, any of the nuggets 21 entering the tube 12, assist in connecting the fishing tool with said tube, but in some instances, a tongue such as 15 or some equivalent means, might be provided only for the purpose of closing the upper portion of the tube, to prevent loss of any of the nuggets down the latter. In the present showing, the enlarged lower end of the tongue 15 closes the upper portion of the tube and prevents loss of the nuggests, as well as assisting in establishing a connection between the tongue and tube.

When fishing for a solid tool or the like, rather than one of tubular nature, the tongue 15 is detached, and a container 20ª of glass or the like, is supported by wires 22 or other desired suspending means, in the upper portion of the barrel 9, the nuggets or the like being held within said container until the latter is broken by contact with the tool or the like. A main, central passage 23 and branch passages 24 are preferably provided in the body 5 to receive the wires 22. The branch passages 24 may well open through the shoulder at the lower end of the squared portion 6, and the upper ends of said wires may be secured, for instance by wedges 25, driven into the passages.

After withdrawal of a tool or the like from the well, it may in some instances be loosened from engagement with the fishing tool, and the latter easily detached. However, in other instances, it may be necessary to unthread the barrel 9 from the body 5 and drive said barrel some distance onto the recovered object, to loosen the nuggets 21 within the space 18. It may also be necessary to disconnect the tongue 15 from the body 5 after disconnection of the barrel 9 from said body, whereupon the tongue may be driven somewhat into the tube, to loosen the nuggets in the space 19. If the barrel and tongue (or the barrel alone, if only said barrel be used) can be successfully disconnected from the recovered object, the tool may be reassembled for further use, but otherwise, it will be necessary to take such steps as would prohibit the further use of the tongue, the barrel, or both.

As excellent results are obtainable from the details disclosed, they may well be followed. However, within the scope of the invention as claimed, numerous variations may be made.

I claim:—

1. In a fishing tool, a vertically disposed barrel open at its lower end to receive a lost tool or other object to be recovered, a fragile container in said barrel adapted to be broken by contact with said object, and gravity-lowered means in said container released by breakage thereof for establishing a tenacious connection between said barrel and said object, said barrel having means independent of said container to prevent loss of said connecting means from the lower end of the barrel.

2. In a fishing tool, a vertically disposed barrel open at its lower end to receive a lost tool or other object to be recovered, said barrel being internally tapered toward its lower end, a fragile container in said barrel adapted to be broken by contact with said object, and gravity-lowered means in said container released by breakage thereof and adapted to wedge in the space between the barrel and object to establish a tenacious connection between them.

3. A structure as specified in claim 1; together with means within the barrel for closing the upper end portion of the object to be recovered, if the latter be of tubular form, preventing loss of any of said connecting means through the tube.

4. A structure as specified in claim 1; together with a tongue within the barrel adapted to enter the object to be recovered, if the latter be of tubular form, said tongue having an enlarged lower end portion to prevent loss of any of said connecting means down the tube, causing any of said connecting means received in the tube, to establish a tenacious connection between tube and tongue.

5. A structure as specified in claim 1; together with a tongue within the barrel adapted to enter the object to be recovered, if the latter be of tubular form, said tongue having an enlarged lower end portion to prevent loss of any of said connecting means down the tube, causing any of said connecting means received in the tube to establish a tenacious connection between tube and tongue, said fragile container being mounted around said tongue.

6. In a fishing tool, a tongue adapted to be lowered into a well and having a pointed lower end for reception in a tube to be recovered, said tongue having a lower portion of substantially the internal diameter of the tube and an upper portion of smaller diameter, a frangible container mounted in position to be struck by the tube after the tongue enters the latter, and gravity-lowered means in said container released by breakage thereof for establishing a tenacious connection between the tube and the tongue.

7. A structure as specified in claim 6; said container being of annular form and surrounding said tongue.

8. A structure as specified in claim 1; said gravity-lowered connecting means consisting of a myriad of sharp-edged nuggets adapted to bite into the barrel and the object being recovered.

9. A structure as specified in claim 6; said gravity-lowered connecting means consisting of a myriad of sharp-edged nuggets adapted to bite into the tube being recovered and into the tongue.

In testimony whereof I have hereunto affixed my signature.

FLOYD H. STAFFORD.